(12) United States Patent
Bohlander et al.

(10) Patent No.: US 11,510,044 B2
(45) Date of Patent: Nov. 22, 2022

(54) COMMUNICATION BETWEEN RESPONDERS

(71) Applicant: Axon Enterprise, Inc., Scottsdale, AZ (US)

(72) Inventors: Michael J. Bohlander, Seattle, WA (US); Raymond T. Fortna, Seattle, WA (US); Anthony G. Huang, Seattle, WA (US); Jeffrey P. Jolma, Seattle, WA (US); Julianne C. Weiss, Los Angeles, CA (US); Aerianna K. Deluca, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/020,716

(22) Filed: Sep. 14, 2020

(65) Prior Publication Data

US 2020/0413238 A1 Dec. 31, 2020

Related U.S. Application Data

(63) Continuation of application No. 16/659,965, filed on Oct. 22, 2019, now Pat. No. 10,779,152, which is a (Continued)

(51) Int. Cl.
*H04W 4/22* (2009.01)
*H04W 76/02* (2009.01)
(Continued)

(52) U.S. Cl.
CPC ............... *H04W 4/90* (2018.02); *H04W 4/02* (2013.01); *H04W 76/14* (2018.02)

(58) Field of Classification Search
CPC ....... H04W 4/22; H04W 4/02; H04W 76/023; H04W 4/90; H04W 76/14; H04W 76/02
See application file for complete search history.

(56) References Cited

U.S. PATENT DOCUMENTS

| 7,034,678 B2 | 4/2006 | Burkley |
| 7,091,851 B2 | 8/2006 | Mason |

(Continued)

FOREIGN PATENT DOCUMENTS

| WO | 2006047597 | 5/2006 |
| WO | 2008027750 | 3/2008 |

OTHER PUBLICATIONS

Sla Corporation, "Enterprise Secure Chat, Administrative Portal Users Guide", Sep. 16, 2014, Revision 1.1, Last Revised Sep. 16, 2014, Filename: ESChat_Admin_Portal_Guide.docx.

(Continued)

*Primary Examiner* — Nathan S Taylor
(74) *Attorney, Agent, or Firm* — Andrew Graham

(57) ABSTRACT

A method for communicating among responders from a plurality of responder agencies includes determining that responders from two responder agencies are located at an event or location. Each of the responders from the two responder agencies has a computing device that is configured to communicate with the other computing device of the responders. Authorization is received from the two responder agencies to permit direct communication between responders from the two responder agencies. A communication link is established between the computing devices of the responders of the two responder agencies in response to determining that the responders from the two responder agencies are located at the event or location and in response to receiving the authorization. The communication link permits direct communication between the responders of the two responder agencies.

20 Claims, 12 Drawing Sheets

Related U.S. Application Data continuation of application No. 16/284,935, filed on Feb. 25, 2019, now Pat. No. 10,477,375, which is a continuation of application No. 15/803,460, filed on Nov. 3, 2017, now Pat. No. 10,237,716, which is a continuation of application No. 14/835,555, filed on Aug. 25, 2015, now Pat. No. 9,843,915.

(51) Int. Cl.
*H04W 4/90* (2018.01)
*H04W 76/14* (2018.01)
*H04W 4/02* (2018.01)

(56) References Cited

U.S. PATENT DOCUMENTS

| | | | |
|---|---|---|---|
| 7,091,852 B2 | 8/2006 | Mason | |
| 7,255,216 B2 | 7/2007 | Burkley | |
| 7,508,840 B2 | 3/2009 | Delaney | |
| 7,652,571 B2 | 1/2010 | Parkulo | |
| 7,898,410 B2* | 3/2011 | Schurter | A62C 99/00 340/539.18 |
| 7,925,246 B2 | 4/2011 | Mckibben | |
| 8,260,338 B2 | 9/2012 | Shaffer | |
| 8,275,404 B2 | 9/2012 | Berger | |
| 8,504,090 B2 | 8/2013 | Klein | |
| 8,520,700 B2 | 8/2013 | Greene | |
| 8,526,934 B2 | 9/2013 | Bennett | |
| 8,665,087 B2 | 3/2014 | Greene | |
| 8,689,013 B2* | 4/2014 | Habraken | G07F 7/1008 713/193 |
| 8,984,143 B2* | 3/2015 | Serra | H04M 3/5116 709/200 |
| 9,125,041 B2 | 9/2015 | Greene | |
| 9,226,124 B2* | 12/2015 | Schuler | H04W 4/021 |
| 9,232,361 B2* | 1/2016 | Calcev | H04L 12/189 |
| 9,526,072 B1* | 12/2016 | Simms | H04W 52/0277 |
| 9,541,407 B1* | 1/2017 | Mohler | H04W 4/90 |
| 9,843,915 B2* | 12/2017 | Bohlander | H04W 4/02 |
| 9,871,767 B2* | 1/2018 | Mazzarella | H04L 63/0428 |
| 9,928,711 B2* | 3/2018 | Clifford | G08B 21/02 |
| 9,986,404 B2* | 5/2018 | Mehta | H04W 76/50 |
| 2005/0001720 A1* | 1/2005 | Mason | G01S 5/0072 340/539.13 |
| 2007/0037596 A1 | 2/2007 | Shaffer et al. | |
| 2007/0103292 A1 | 5/2007 | Burkley | |
| 2007/0202908 A1* | 8/2007 | Shaffer | H04W 4/021 455/518 |
| 2007/0281723 A1* | 12/2007 | Chotai | H04L 65/4061 455/518 |
| 2008/0037461 A1* | 2/2008 | Biltz | H04L 41/0816 370/328 |
| 2008/0181132 A1* | 7/2008 | Underhill | H04L 12/1818 370/254 |
| 2008/0299940 A1 | 12/2008 | Shaffer et al. | |
| 2009/0207852 A1* | 8/2009 | Greene | H04W 28/14 370/465 |
| 2010/0159976 A1 | 6/2010 | Marocchi et al. | |
| 2010/0304731 A1* | 12/2010 | Bratton | H04N 5/23206 455/420 |
| 2012/0026947 A1 | 2/2012 | Miller | |
| 2012/0322402 A1* | 12/2012 | Sennett | H04W 4/029 455/404.1 |
| 2013/0198517 A1* | 8/2013 | Mazzarella | H04L 63/0823 713/168 |
| 2013/0331139 A1* | 12/2013 | Mills | H04M 3/5116 455/509 |
| 2013/0342361 A1 | 12/2013 | Greene | |
| 2014/0094119 A1* | 4/2014 | Stojanovski | H04W 28/16 455/41.1 |
| 2014/0187189 A1* | 7/2014 | Reitsma | H04W 12/06 455/404.1 |
| 2014/0187190 A1* | 7/2014 | Schuler | H04W 12/084 455/404.1 |
| 2014/0187228 A1 | 7/2014 | Bekiares | |
| 2014/0187280 A1 | 7/2014 | Bekiares | |
| 2016/0227384 A1* | 8/2016 | Mazzarella | H04W 12/08 |
| 2017/0201867 A1* | 7/2017 | Mazzarella | H04W 4/10 |
| 2017/0251347 A1* | 8/2017 | Mehta | H04W 4/90 |
| 2020/0322038 A1* | 10/2020 | Mills | B64C 39/026 |

OTHER PUBLICATIONS

Sla Corporation, Enterprise Secure Chat, Feb. 5, 2015, Internet web pages, http://www.sla-ptt.com/.

USPTO, Non-Final Office Action for U.S. Appl. No. 14/835,555 dated Oct. 20, 2016.

USPTO, Final Office Action for U.S. Appl. No. 14/835,555 dated Mar. 30, 2017.

USPTO, Notice of Allowance for U.S. Appl. No. 14/835,555 dated Aug. 23, 2017.

USPTO, Non-Final Office Action for U.S. Appl. No. 15/803,460 dated May 17, 2018.

USPTO, Notice of Allowance for U.S. Appl. No. 16/284,935 dated Jul. 1, 2019.

USPTO, Notice of Allowance for U.S. Appl. No. 16/659,965 dated Mar. 31, 2020.

European Patent Office, Decision to Refuse for European Application No. 15763140.9-1222 dated Feb. 18, 2021.

European Patent Office, Communication pursuant to Article 94(3) for European Application No. 15763140.9-1222 dated Jan. 16, 2019.

* cited by examiner

COMMUNICATION BETWEEN RESPONDERS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method for communicating among responders from a plurality of responder agencies includes determining that a first plurality of responders from a first responder agency are located at an event or location and determining that a second plurality of responders from a second responder agency are located at the event or location. Each of the first plurality of responders has a computing device and the computing devices of the first plurality of responders are configured to communicate with each other. Each of the second plurality of responders has a computing device and the computing devices of the second plurality of responders are configured to communicate with each other. The method further includes receiving authorization from the first and second responder agencies to permit direct communication between responders from the first and second responder agencies and, in response to determining that the first plurality of responders and the second plurality of responders are located at the event or location and in response to receiving the authorization, establishing a communication link between the computing devices of the first plurality of responders and the computing devices of the second plurality of responders. The communication link permits direct communication between the first plurality of responders and the second plurality of responders.

In one example, the method further includes defining an administrative responder from one of the first plurality of responders and the second plurality of responders, where the computing devices of the first plurality of responders and the computing devices of the second plurality of responders are configured to give priority to communications from a computing device of the administrative responder. In another example, the method further includes reducing, by one of the computing devices of the first plurality of responders and the computing devices of the second plurality of responders, a resolution of a message prior to sending the message via the communication link. In another example, the message is a video stream.

In another example, the method further includes deploying one or more communication relay devices at the event or location, where the one or more communication relay devices are configured to relay communications sent via the communication link. In another example, the one or more communication relay devices are further configured to send a copy of the communications to a remote computing device.

In another example, the method further includes receiving information about a particular locale at the event or location from a first responder of the first plurality of responders and the second plurality of responders, determining that a computing device of a second responder of the first plurality of responders and the second plurality of responders is at the particular locale, and sending the information about the particular locale to the computing device of a second responder. In another example, the method further includes receiving a signal from a first responder of the first plurality of responders and the second plurality of responders where the signal indicates that a computing device of the first responder is at a particular locale, determining that a computing device of a second responder of the first plurality of responders and the second plurality of responders is at the particular locale, and sending, to the computing device of the second responder, an indication of the signal received from the first responder.

In another embodiment, a method of communicating among a plurality of responders includes defining a subset of the plurality of responders associated with a first responder where each of the first responder and the responders in the subset has a computing device, establishing a communication link between the computing devices of the first responder and the plurality of responders in the subset, establishing a priority rank among the first responder and the responders in the subset, and sending communications between computing devices the first responder and the responders in the subset based on the priority rank.

In one example, the communications between the first responder and the responders in the subset comprise push-to-talk audio communications. In another example, the computing devices of the plurality of responders in the subset are configured to determine a conflict between push-to-talk audio communications sent by at least two responders and to play one of push-to-talk audio communications based on the priority rank of the at least two responders. In another example, the communications between the first responder and the responders in the subset comprise at least one video clip. In another example, the subset of the plurality of responders comprises a second responder that is a supervisor of the first responder. In another example, the computing device of the first responder is configured to send an alert to the second responder via the communication link in response to an event at the location of the first responder.

In another example, defining the subset of the plurality of responders associated with the first responder comprises receiving an indication of the subset from the first responder. In another example, the method further includes requesting confirmation to add a superior of the first responder to the communication link in response to determining that the indication from the first responder includes the superior of the first responder. In another example, the indication of the subset from the first responder comprises an indication of responders within a geographic boundary defined by the first responder. In another example, the subset of the plurality of responders is defined based on one or more of locations of the computing devices the plurality of responders in the subset or the priority rank of the plurality of responders in the subset.

In another example, the method further includes receiving, by the computing device of the first responder, a message sent from the computing device of a second responder of the responders in the subset via the communication link to the computing devices of the responder and the other responders in the subset, receiving, by the computing device of the first responder, a request to send a response to the second responder, and sending the response via the communication link from the computing device of the first responder to the computing device of the second responder. In another example, the method further includes sending an indication of the particular locale from the computing device of the first responder to a remote computing device in response to determining that the computing device is at a particular locale and receiving, by the computing device of the first responder from the remote computing device, information about the particular locale generated by a second responder.

In another embodiment, a system for communicating among a plurality of responders, the system includes a computing device associated with a first responder and instructions stored in the computing device. The instructions, in response to execution by the computing device, cause the computing device to define a subset of the plurality of responders where each of the responders in the subset has a computing device, establish a communication link between the computing devices of the first responder and the plurality of responders in the subset, and send communications to the computing devices of the responders in the subset based on a priority rank among the first responder and the responders in the subset.

In another embodiment, a computer-readable medium has instructions thereon for communicating among a plurality of responders. The instructions, in response to execution by a computing device of a first responder, cause the computing device to define a subset of the plurality of responders where each of the responders in the subset has a computing device, establish a communication link between the computing devices of the first responder and the plurality of responders in the subset, and send communications to the computing devices of the responders in the subset based on a priority rank among the first responder and the responders in the subset.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
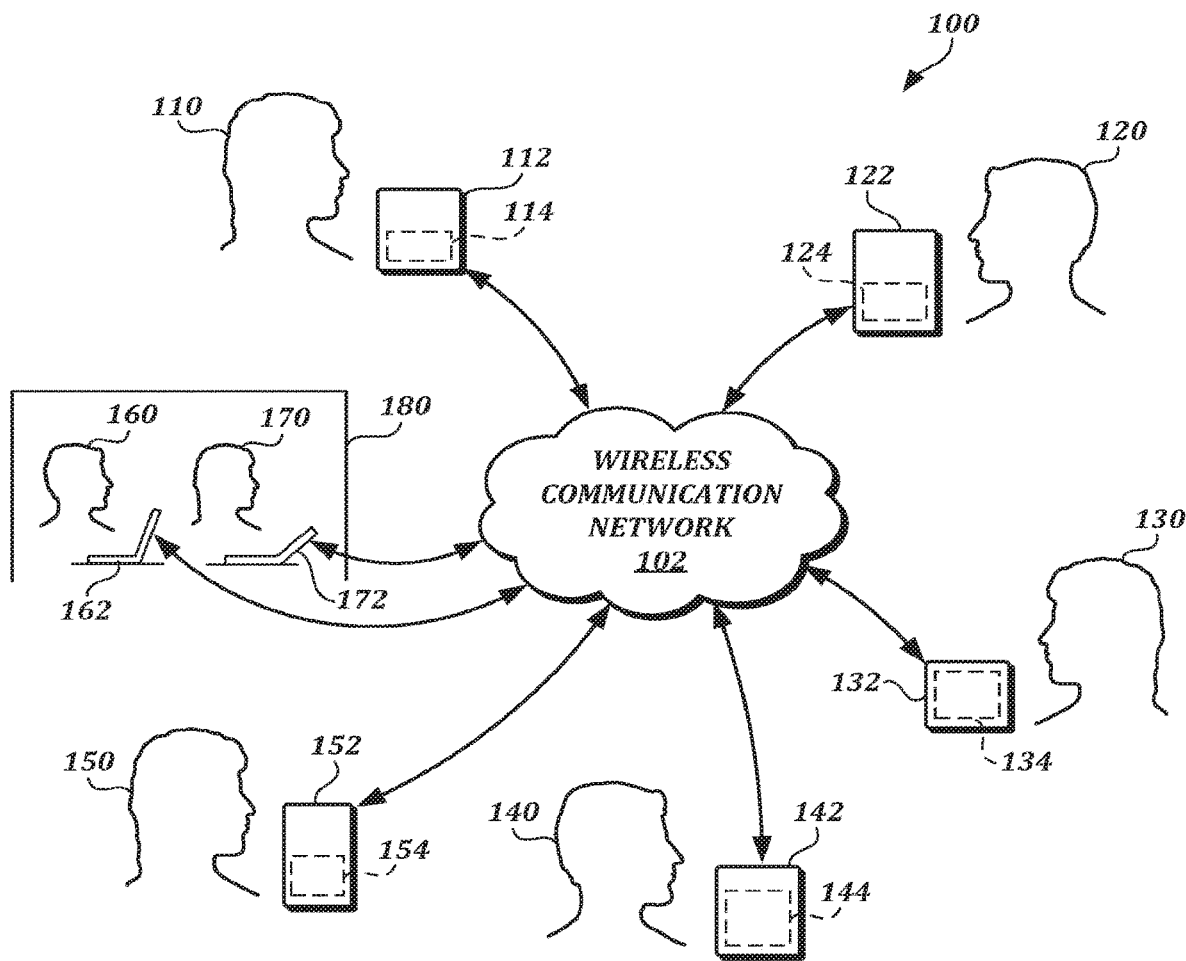
FIG. 1 depicts an embodiment of a system for communication between computing devices of responders via a network, in accordance with the embodiments disclosed herein.

Embodiments of the present disclosure are generally directed to techniques and tools for establishing communication between responders by establishing a communication link between computing devices of the responders. For example, in one or more embodiments, a communication link is established between computing devices of a first plurality of responders from a first responder agency and computing devices of a second plurality of responders from a second responder agency. In one embodiment, prior to establishing the communication link, a determination is made that the first plurality of responders and the second plurality of responders are at an event or location. In another embodiment, prior to establishing the communication link, authorization is received from the first and second responder agencies to permit direct communication between responders from the first and second responder agencies.

A responder is any individual that is part of an agency that responds to particular situations. Examples of responders include law enforcement officials, firefighting officials, paramedics, private security personnel, private responders (e.g., tow truck drivers and roadside assistance personnel), and the like. Law enforcement officials include police officers, sheriffs and sheriff deputies, state patrol officers, federal agency officers (e.g., Federal Bureau of Investigation agents, Central Intelligence Agency agents, Transportation Security Administration officers, etc.), members of the National Guard, members of the armed forces, and the like. Examples of responders also include supervisors (e.g., police sergeants) and dispatchers of other responders. Examples of responder agencies include police departments, sheriff offices, fire departments, federal agencies, private companies of private security personnel and private responders, and the like.

In another example, in one or more embodiments, a subset of a plurality of responders associated with a first responder is defined, a communication link between the computing devices of the first responder and the plurality of responders in the subset is established, a priority rank among the first responder and the responders in the subset is established, and communications between computing devices the first responder and the responders are sent via the communication link subset based on the priority rank.

In some embodiments, communication links between responders, whether between responders of the same or different agencies, allow a variety of communications between responders. In some examples, communications include one or more of live audio, recorded audio, live video, recorded video, text (e.g., text messages, text alerts, documents, etc.), or any other type of communication. The ability to effectively establish communication links with desired sets of responders greatly increases the flow of information to proper responders for a given situation.

Legacy communication systems allow responders to communicate. For example, many law enforcement departments use radios to communicate live audio between law enforcement officers (e.g., officers on duty, their supervisors, dispatchers, etc.). However, legacy communication systems have many downfalls. For example, radio communication systems typically allow for only one user to transmit information at one time; competing transmissions generally are not heard or cancel each other out. In another example, radio communication systems do not give priority to any one user over another user. In yet another example, responders in different responder agencies typically use different radio frequencies and/or channels such that adjusting responder radio systems to allow responders from different agencies to communication with each other time-consuming and complex. In yet another example, radio communication systems typically do not permit communication of non-audio information (e.g., video).

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

FIG. 1 depicts an embodiment of a system 100 for communication between computing devices of responders via a network 102. The system includes a responder 110 that has a computing device 112 that is capable of communicating via the network 102. In some embodiments, the network 102 is a wireless communication network using one or more wireless communication protocols, such as WiFi, 2G, 3G, 4G, LTE, WiMAX, Bluetooth, and the like. In the depicted embodiment, the computing device 112 includes a communication application 114 that includes instructions that cause the computing device 112 to establish a communication link between computing devices of other responders via the network 102. In some embodiments, the communication links described herein are peer-to-peer communication links. In other embodiments, the communication links described herein are server-mediated communication links. In other embodiments, the communication links described herein use one or more protocols, such as the internet protocol, mobile telephony protocols, push-to-talk over cellular protocols, and the like.

The system 100 also includes responders 120, 130, 140, and 150. Each of the responders 120, 130, 140, and 150 has one of computing devices 122, 132, 142, and 152 that are capable of communicating via the network 102. Each of the computing devices 122, 132, 142, and 152 includes one of the communication applications 124, 134, 144, 154 that includes instructions that cause the computing devices 122, 132, 142, and 152 to establish a communication link between computing devices of other responders via the network 102.

In the depicted embodiment, the system 100 also includes a responder 160 and a responder 170 located at a remote location 180. Each of the responder 160 and the responder 170 is located in a remote location 180, such as a responder agency office, dispatch unit, and the like. The responder 160 has a computing device 162 and the responder 170 has a computing device 172. Each of the computing devices 162 and 172 is capable of communicating via the network 102. Each of the computing devices 162 and 172 includes a communication application that includes instructions that cause the computing devices 162 and 172 to establish a communication link between computing devices of other responders via the network 102. In one embodiment, the responder 160 is a dispatcher of one or more of the responders 110, 120, 130, 140, and 150. In another embodiment, the responder 170 is a supervisor of one or more of the responders 110, 120, 130, 140, and 150.

In some embodiments, each of the computing devices 112, 122, 132, 142, 152, 162, and 172 includes one or more of a cell phone, tablet computer, smart wearable (e.g., a smart watch), a laptop computer, a desktop computer, and the like. In one example, the computing devices 112, 122, 132, 142, and 152 are personal of the responders 110, 120, 130, 140, and 150 and are not issued by any responder agency of the responders 110, 120, 130, 140, and 150. In that case, the communication applications 114, 124, 134, 144, and 154 are configured to enable communication between the personal computing devices 112, 122, 132, 142, and 152 of the responders 110, 120, 130, 140, and 150 with each other and with computing devices of one or more responder agencies, such as computing devices 162 and 172.

In another example, when communicating via the network 102, the computing devices 112, 122, 132, 142, 152, 162, and 172 are capable of sending communications directly to another of the computing devices 112, 122, 132, 142, 152, 162, and 172 (i.e., direct communication), to a subset of the computing devices 112, 122, 132, 142, 152, 162, and 172 (i.e., selective communication), or to all of the computing devices 112, 122, 132, 142, 152, 162, and 172 (i.e., broadcast communication). In some embodiments, as discussed in greater detail below, communications are sent between one or more of the computing devices 112, 122, 132, 142, 152, 162, and 172 via a communication link based on a priority rank among at least two of the responders 110, 120, 130, 140, 150, 160, and 170.

In some embodiments, the responders 110, 120, 130, 140, 150, 160, and 170 are all associated with the same responder agency. Examples of responders from the same responder agency include police officers from the same police department, firefighters from the same fire department, private security personnel from the same organization, and the like. In other embodiments, at least some of the responders 110, 120, 130, 140, 150, 160, and 170 are associated with different responder agencies. Examples of responders from different responder agencies include police officers from one police department and police officers from another police department, state patrol officers and sheriffs deputies, federal agency agents and members of the armed forces, and the like. As described in greater detail below, when responders at least some of the responders 110, 120, 130, 140, 150, 160, and 170 are from different agencies, some embodiments of communication applications on the computing devices 112, 122, 132, 142, 152, 162, and 172 enable the responders 110, 120, 130, 140, 150, 160, and 170 from different agencies to establish a communication link to communicate with each other.

Figure 2:
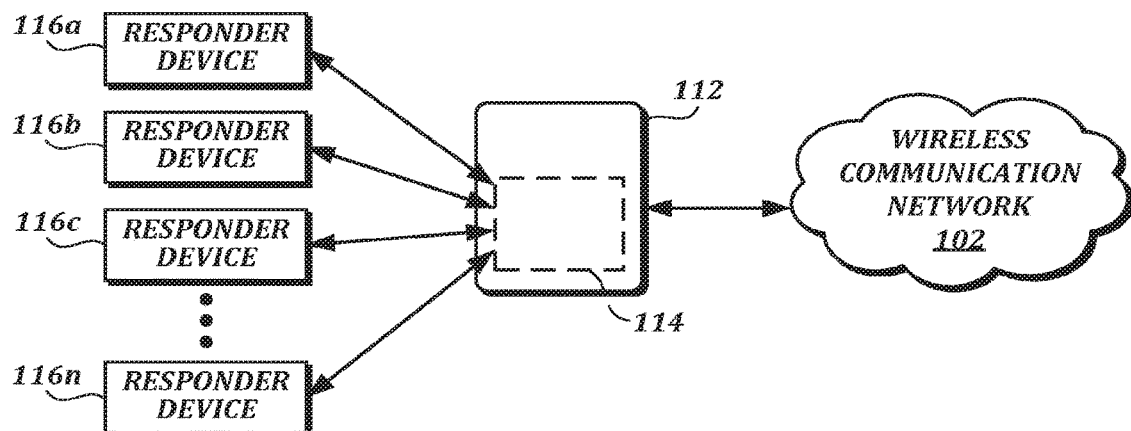
FIG. 2 depicts an embodiment of capabilities of a computing device depicted in FIG. 1, in accordance with embodiments of computing devices disclosed herein.

An embodiment of the capabilities of the computing device 112 is depicted in FIG. 2. As described above, the computing device 112 includes the communications application 114 and is capable of communicating via the network 102. The computing device 112 is also capable of communicating with any number of responder devices 116a-n. Examples of the responder devices 116a-n include devices worn or carried by the responder 110, such as an on-body camera, a stun device, a firearm holster, an on-body microphone, a radio, and the like. Other examples of the responder devices 116a-n include devices associated with a vehicle of the responder 110, such as a light bar, a dashboard camera, a microphone, an in-vehicle sensor, and the like. The responder devices 116a-n can include any other device associated with the responder 110.

In some embodiments, the communications application 114 includes instructions that, when executed, cause the computing device 112 to send communications via the network 102 to computing devices of other responders. In some embodiments, the communications include information provided at least one of the responder devices 116a-n. In some examples, the communication can include video from an on-body camera, audio from an on-body microphone, and the like. In some embodiments, the communication can include information indicative of a status change of the responder devices 116a-n. In some examples, the communication includes an indication that a light bar of a vehicle has been activated, an indication that a holster has been unlocked to allow removal of a firearm, and the like. In other embodiments, the communication can include information from the computing device 112. In some examples, the communication includes audio captured by a microphone of the computing device 112, text entered into the computing device 112, and the like.

In another embodiment, the communications application 114 includes instructions that, when executed, cause the computing device 112 to process information prior to sending it via the network 102. In one example, the communications application 114 causes the computing device 112 to reduce a resolution of the information (e.g., pictures, recorded video, video streams, etc.) prior to sending the information via the network 102. In another example, the communications application 114 causes the computing device 112 to tag the information with metadata (e.g., a time of capture of the information, a location of capture of the information, etc.) prior to sending the information via the network 102. In another example, the communications application 114 causes the computing device 112 to compile multiple forms of information (e.g., text and images) into a single transmission via the network 102.

The depiction in FIG. 2 includes an embodiment of the computing device 112. However, this embodiment is not limited only to computing device 112. Any of the other computing devices described herein, such as computing devices 122, 132, 142, 152, 162, and 172, may have similar capabilities to communicate via the network 102 and to communicate with responder devices associated with the computing devices.

Figure 3:
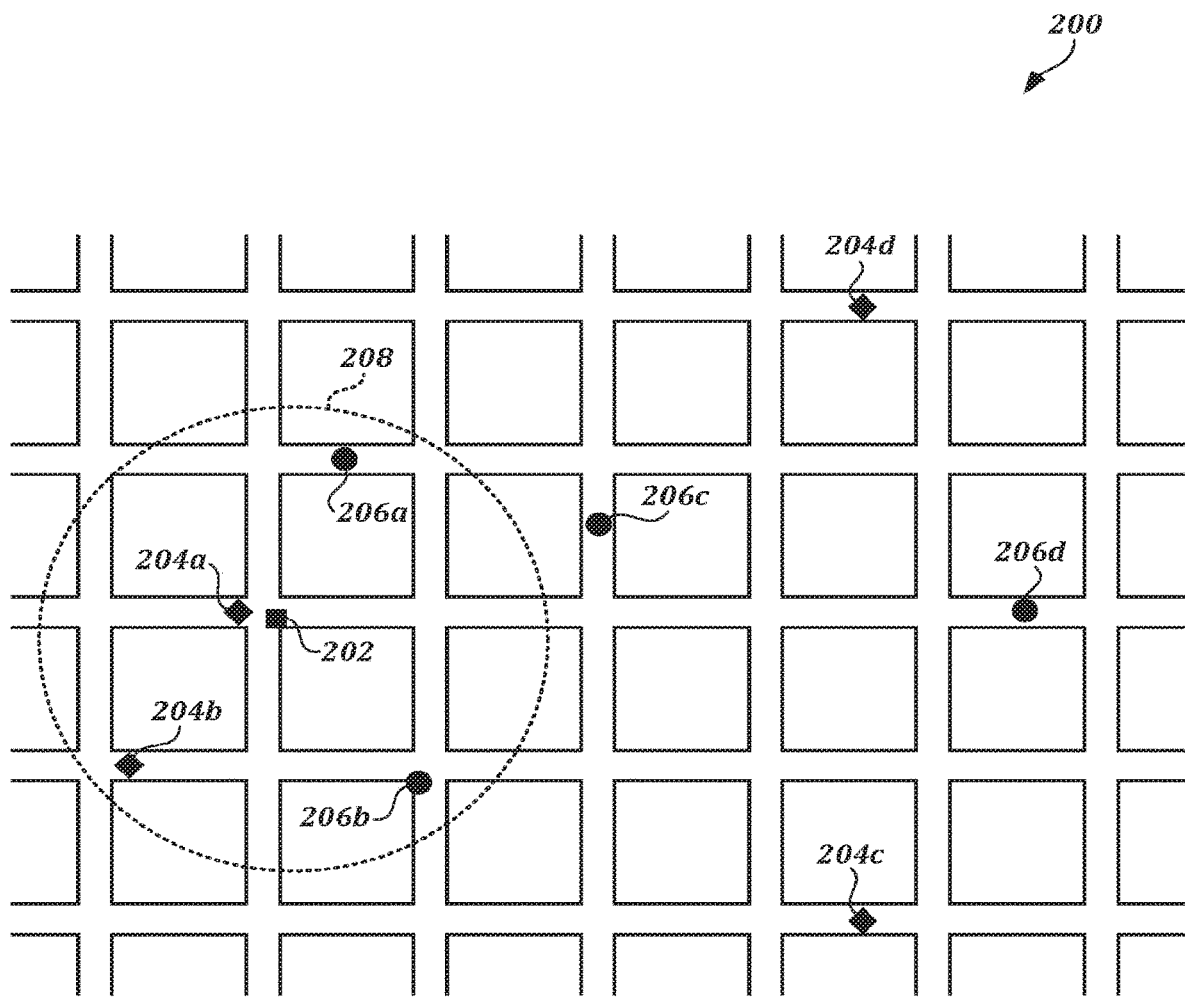
FIG. 3 depicts an embodiment of establishing a communication link between responders from different agencies at a particular location, in accordance with the embodiments disclosed herein.

An embodiment of establishing a communication link between responders from different agencies at a particular location is depicted in FIG. 3. Depicted in FIG. 3 is a representation of a map 200. The map 200 includes an indication of an incident 202. In one example, the incident 202 is one or more of a vehicle collision, a crime, an investigation, and the like. The map 200 also includes indications of responders 204a-d and indications of responders 206a-d. In one example, the responders 204a-d are from a first responder agency (e.g., a police department), and the responders 206a-d are from a second responder agency (e.g., a fire department).

Each of the responders 204a-d has a computing device (e.g., computing device 112) and the computing devices of the responders 204a-d are configured to communicate with each other. Each of the responders 206a-d has a computing device (e.g., computing device 112) and the computing devices of the responders 206a-d are configured to communicate with each other. In some embodiments, the computing devices of the responders 204a-d and the computing devices of the responders 206a-d are configured to send indications of their locations to one or more remote computing device. In one example, the computing devices of the responders 204a-d send indications of their locations to a remote computing device of the first responder agency and the computing devices of the responders 206a-d send indications of their locations to a remote computing device of the second responder agency.

In some embodiments, determinations are made as to which of the responders 204a-d and which of the responders 206a-d are at a location of the incident 202. In the particular embodiment depicted in FIG. 3, the location of the incident 202 is defined by an area 208 having a radius from the incident 202. Thus, a determination is made that responders 204a-b are at the location of the incident 202 (i.e., within the area 208) and a determination is made that the responders 206a-b are at the location of the incident 202.

In some embodiments, authorization is received from the first and second responder agencies to permit direct communication between responders from the first and second responder agencies. In one example, the authorization is particular to the particular incident 202, such as specific authorization to permit responders 204a-b and responders 206a-b to communicate directly when responding to the particular incident 202. In another example, the authorization is a blanket authorization for responders from the first responder agency and responders from the second responder agency to communicate directly when in the location of any event or location. In other examples, authorization can take any number of forms or have any number of conditions.

In another embodiment, in response to the determinations that responders 204a-b and responders 206a-b are at the location of the incident 202 and in response to receiving authorization from the first and second responder agencies, a communication link is established between the responders 204a-b and responders 206a-b. In one example, establishing the communication link includes permitting communication applications on the computing devices of the responders 204a-b and responders 206a-b to send and receive information to and from the other computing devices of the responders 204a-b and responders 206a-b. In one example, the communication applications on the computing devices of the responders 204a-b and responders 206a-b include a push-to-talk feature that mimics a radio device where pressing a button or icon on a computing device allows one of the responders 204a-b and 206a-b to send live audio to each of the computing devices of the others of responders 204a-b and 206a-b. In another embodiment, the communication applications on the computing devices of the responders 204a-b and responders 206a-b stream live video to each of the computing devices of the others of responders 204a-b and 206a-b.

Push-to-talk audio communications are initiated by activating a transmission on a computing device of a live audio stream from the computing device. In some embodiments, activating the transmission is done by pressing a button (e.g., a physical button or a button displayed on a touchscreen device) and the transmission of live audio stream occurs while the button is pushed. In some embodiments, push-totalk audio communications are broadcast from the computing device to all of the responders on the communication link or in a subset of the communication link. In other embodiments, push-to-talk audio communications are sent directly to a single recipient computing device.

In the embodiment depicted in FIG. 3, the responders 204a-b and the responders 206a-b are enabled to communicate with each other without the need to reconfigure existing communication systems. For example, the responders 204a-b and the responders 206a-b do not need to reconfigure radio frequencies and/or channels to be able to communicate. It also leaves the radio frequencies open for other communications unrelated to the incident 202.

Figure 4:
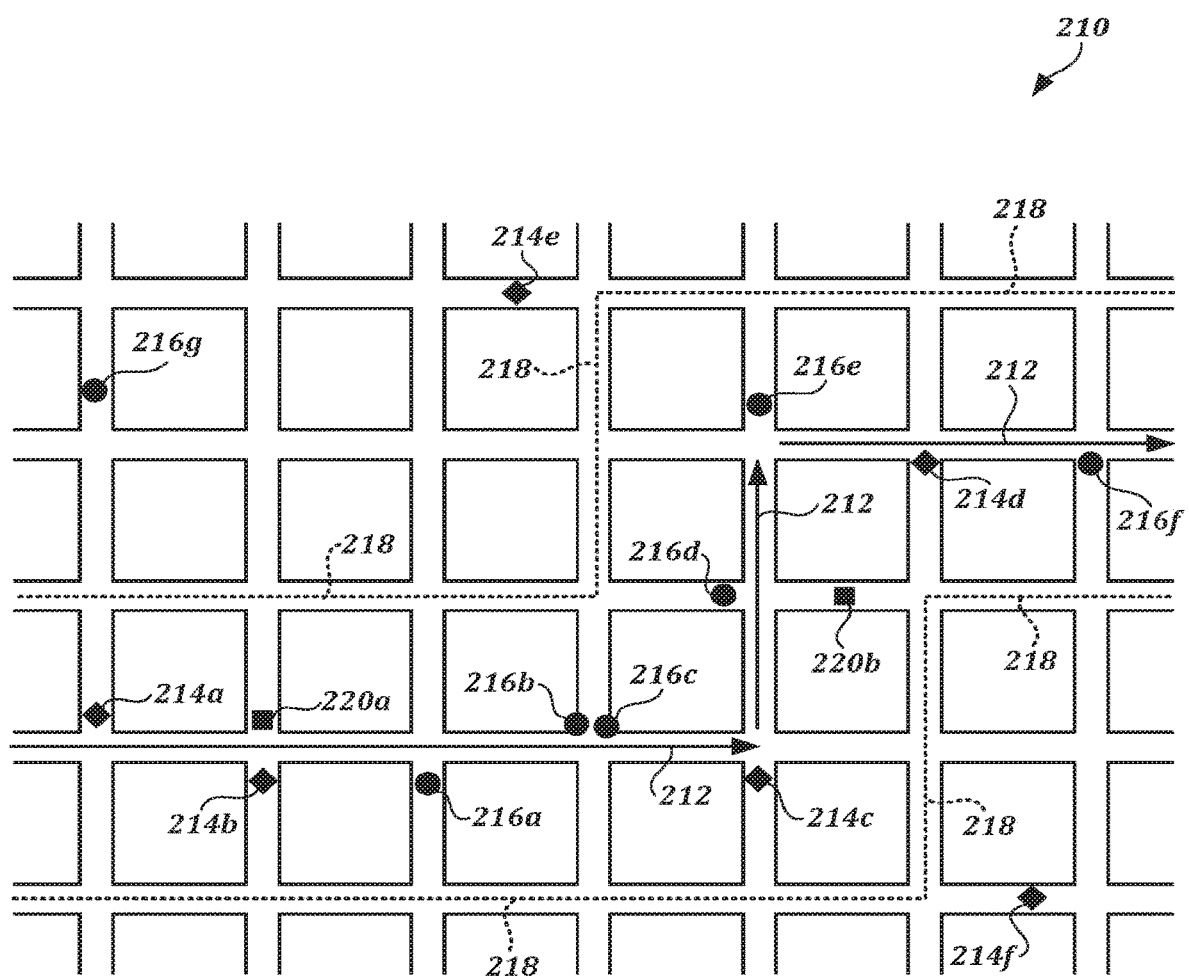
FIG. 4 depicts an embodiment of establishing a communication link between responders from different agencies at a particular event, in accordance with the embodiments disclosed herein.

An embodiment of establishing a communication link between responders from different agencies at a particular event is depicted in FIG. 4. Depicted in FIG. 4 is a representation of a map 210. The map 210 includes an indication of a portion of a parade route 212. The map 210 also includes indications of responders 214a-f and indications of responders 216a-g. In one example, the responders 214a-f are from a first responder agency (e.g., a police department), and the responders 216a-g are from a second responder agency (e.g., a sheriffs office). Each of the responders 214a-f has a computing device (e.g., computing device 112) and the computing devices of the responders 214a-f are configured to communicate with each other. Each of the responders 216a-g has a computing device (e.g., computing device 112) and the computing devices of the responders 216a-g are configured to communicate with each other.

In some embodiments, determinations are made as to which of the responders 214a-f and which of the responders 216a-g are at a location of the event. In the particular embodiment depicted in FIG. 4, the location of the event is defined by an area 218 that is within a certain distance from the parade route 212. Thus, a determination is made that responders 214a-d are at the location of the event (i.e., within the area 218) and a determination is made that the responders 216a-f are at the location of the event. In some embodiments, as described above, authorization is received from the responder agencies of responders 214a-d and responders 216a-f to permit direct communication between responders from the responder agencies. In another embodiment, in response to the determinations that responders 214a-d and responders 216a-f are at the location of the event and in response to receiving authorization from the responder agencies, a communication link is established between the responders 214a-d and the responders 216a-f.

In other embodiments, one or more communication relay devices are used to improve the communication link between the responders 214a-d and the responders 216a-f. In the depicted embodiment, communication relay devices 220a-b are set up near the parade route 212. The communication relay devices 220a-b are configured to relay communications sent via the communication link. In one example, the communication relay devices 220a-b are temporary cell phone towers that form part of a network (e.g., network 102) that relays cellular telephone communication between the computing devices of the responders 214a-d and the responders 216a-f. In another example, the communication relay devices 220a-b are temporary WiFi towers that form part of a network (e.g., network 102) that relays WiFi communication between the computing devices of the responders 214a-d and the responders 216a-f. In one example, the communication relay devices 220a-b are configured to relay communications only between the responders 214a-d and the responders 216a-f. In this way, even if public communication relay devices are operating at or beyond bandwidth, the responders 214a-d and the responders 216a-f will still be able to communicate with each other. In another embodiment, the communication relay devices 220a-b are configured to send a copy of communications to a remote computing device (e.g., a server of a responder agency) to store a copy of the communications. Such copies of communications stored on remote computing devices may be useful for evidentiary or other purposes.

In another embodiment, the computing devices of the responders 214a-d and the responders 216a-f send signals to a remoter computing device (e.g., a server of a responder agency) indicative of an event at a particular locale. For example, the computing device of the responder 214a may receive a signal from a stun device indicating that the responder 214a used the stun device at the intersection where the responder 214a is located in FIG. 4. The computing device of the responder 214a sends an indication of the stun device use to the remote computing device. The remote computing device determines that the responder 214b is located is at the locale of the responder 214a (i.e., within a particular distance of the responder 214a). The remote computing device sends, to the computing device of the responder 214b, an indication of the signal that the responder 214a used a stun device along with the location of the responder 214a. In this way, the responder 214b is automatically alerted to the use of the stun device by the responder 214a without the responder 214a having to send any messages by way of radio or computing device.

Figure 5:
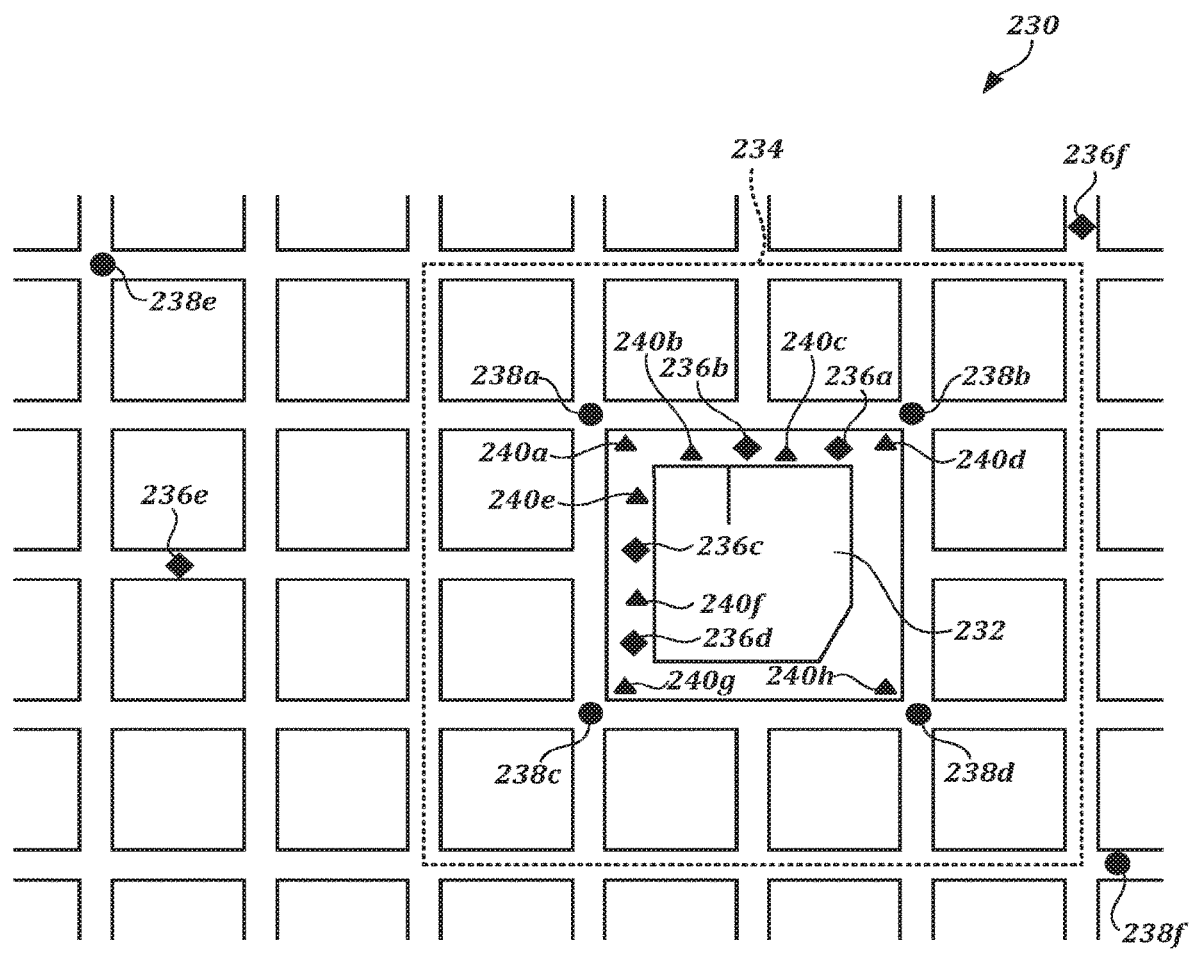
FIG. 5 depicts an embodiment of establishing a communication link between responders from different agencies at another event, in accordance with the embodiments disclosed herein.

An embodiment of establishing a communication link between responders from different agencies at another event is depicted in FIG. 5. Depicted in FIG. 5 is a representation of a map 230. The map 230 includes an indication of a portion of a baseball field 232. The map 230 also includes indications of responders 236a-f, indications of responders 238a-f, and indications of responders 240a-h. In one example, the responders 236a-f are from a first responder agency (e.g., a police department), the responders 238a-f are from a second responder agency (e.g., a sheriffs office), and the responders 240a-h are from a third responder agency (e.g., a security department of the baseball field 232). Each of the responders 236a-f has a computing device (e.g., computing device 112) and the computing devices of the responders 236a-f are configured to communicate with each other. Each of the responders 238a-f has a computing device (e.g., computing device 112) and the computing devices of the responders 238a-f are configured to communicate with each other. Each of the responders 240a-h has a computing device (e.g., computing device 112) and the computing devices of the responders 240a-h are configured to communicate with each other.

In some embodiments, determinations are made as to which of the responders 236a-f, which of the responders 238a-f, and which of the responders 240a-h are at a location of the event. In the particular embodiment depicted in FIG. 5, the location of the event is defined by an area 234 that is within a certain distance from the baseball field 232. Thus, a determination is made that responders 236a-d are at the location of the event (i.e., within the area 234), a determination is made that responders 238a-d are at the location of the event, and a determination is made that the responders 240a-h are at the location of the event. In some embodiments, as described above, authorization is received from the responder agencies of responders 236a-d, responders 238a-d, and responders 240a-h to permit direct communication between responders from the responder agencies. In another embodiment, in response to the determinations that responders 236*a-d*, responders 238*a-d*, and responders 240*a-h* are at the location of the event and in response to receiving authorization from the responder agencies, a communication link is established between the responders 236*a-d*, responders 238*a-d*, and responders 240*a-h*.

As shown in the embodiment in FIG. 5, in certain embodiments, a communication link is established between both public responders (e.g., police officers) and private responders (e.g., private security personnel). This ability to establish communication link between public and private responders allows for better coordination when both public and private responders are involved at a location or event without having to adjust normal public responder communication channels to accommodate private responders. In one embodiment, one of the responders 236*a-d*, responders 238*a-d*, and responders 240*a-h* in the area 234 is defined as an administrative responder. In this embodiment, computing devices of the others of the responders 236*a-d*, responders 238*a-d*, and responders 240*a-h* are configured to give priority to communications from the computing device of the administrative responder. For example, the computing devices of the responders 236*a-d*, responders 238*a-d*, and responders 240*a-h* are configured to interrupt communications to or from responders other than the administrative responder when a communication is received from the computing devices of the administrative responder. In this way, the administrative responder is able to send messages that will be delivered to all of the other responders regardless of any other communications that are going on between the other responders.

Figure 6:
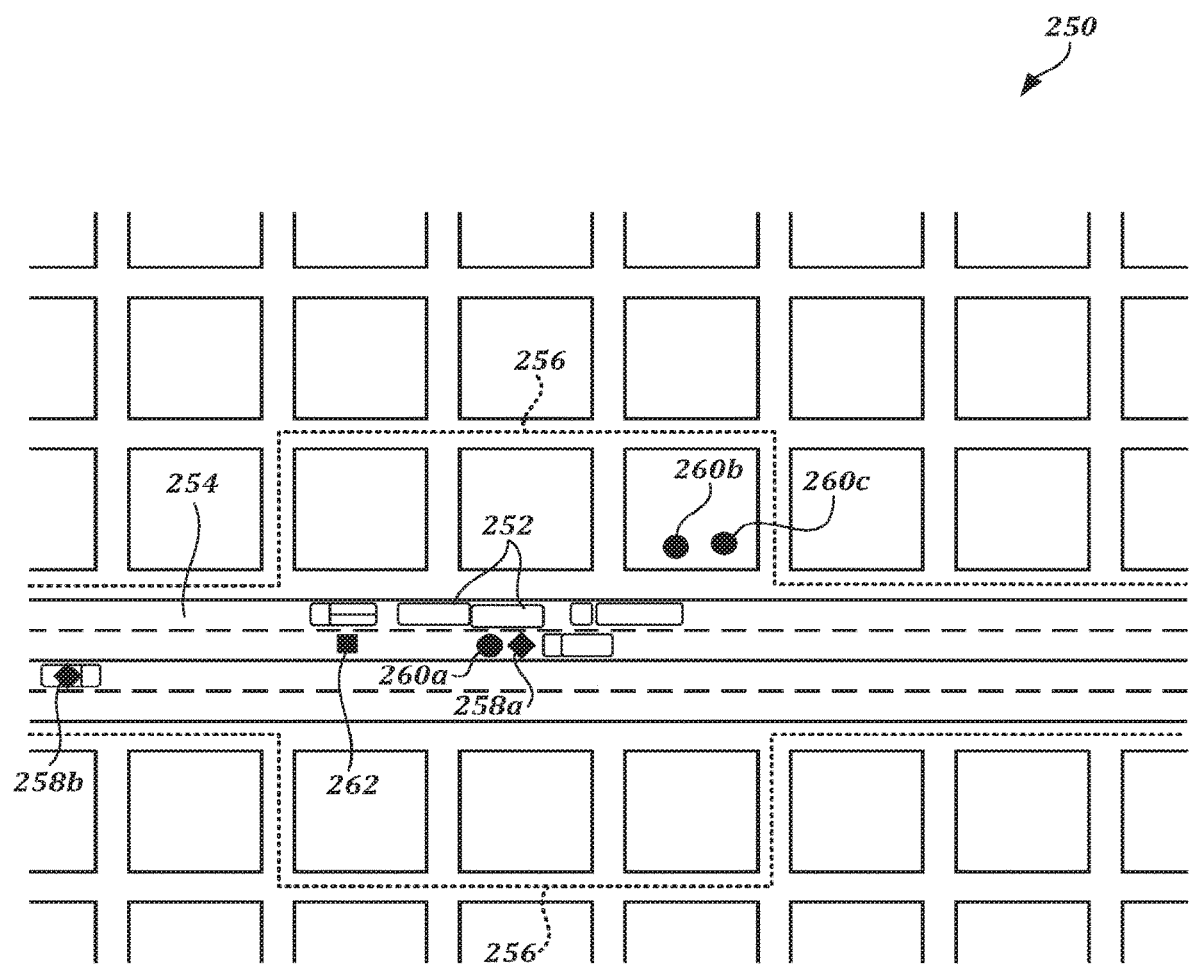
FIG. 6 depicts an embodiment of establishing a communication link between responders from different agencies at another location, in accordance with the embodiments disclosed herein.

An embodiment of establishing a communication link between responders from different agencies at another location is depicted in FIG. 6. Depicted in FIG. 6 is a representation of a map 250. The map 250 includes an indication of an incident in the form of a car collision 252 on a freeway 254. The map 250 also includes indications of responders 258*a-b*, indications of responders 260*a-c*, and an indication of a responders 262. In one example, the responders 258*a-b* are from a first responder agency (e.g., highway patrol), the responders 260*a-c* are from a second responder agency (e.g., a fire department), and the responder 262 is from a third responder agency (e.g., a tow truck company). Each of the responders 258*a-b* has a computing device (e.g., computing device 112) and the computing devices of the responders 258*a-b* are configured to communicate with each other. Each of the responders 260*a-c* has a computing device (e.g., computing device 112) and the computing devices of the responders 260*a-c* are configured to communicate with each other. The responder 262 has a computing device (e.g., computing device 112).

In some embodiments, determinations are made as to which of the responders 258*a-b*, which of the responders 260*a-c*, and that the responder 262 is at a location of the event. In the particular embodiment depicted in FIG. 6, the location of the car collision 252 is defined by an area 256. The area 256 is an irregular shape that includes portions of the freeway 254 and other areas of the map 250 within a particular distance of the car collision 252. Thus, a determination is made that responders 258*a-b* are at the location of the car collision 252 (i.e., within the area 256), a determination is made that responders 260*a-c* are at the location of the car collision 252, and a determination is made that the responders 240*a-h* are at the location of the car collision 252. In some embodiments, as described above, authorization is received from the responder agencies of responders 258*a-b*, responders 260*a-c*, and the responder 262 to permit direct communication between responders from the responder agencies. In another embodiment, in response to the determinations that the responders 258*a-b*, the responders 260*a-c*, and the responder 262 are at the location of the car collision 252 and in response to receiving authorization from the responder agencies, a communication link is established between the responders 258*a-b*, the responders 260*a-c*, and the responder 262.

As shown in FIG. 6, in some embodiments, not all of the responders deemed to be at the location or event is immediately able to help. For example, responders 260*b* and 260*c* are not on the freeway 254 and immediately able to help at the car collision 252. However, the responders 258*b*, 260*b* and 260*c* receive communication via the established communication link and can determine whether they should move onto the freeway 254 to assist at the car collision 252. In addition, the communication link can be used to request that the responders 258*b*, 260*b* and 260*c* move onto the freeway 254 to assist at the car collision 252.

Figure 7:
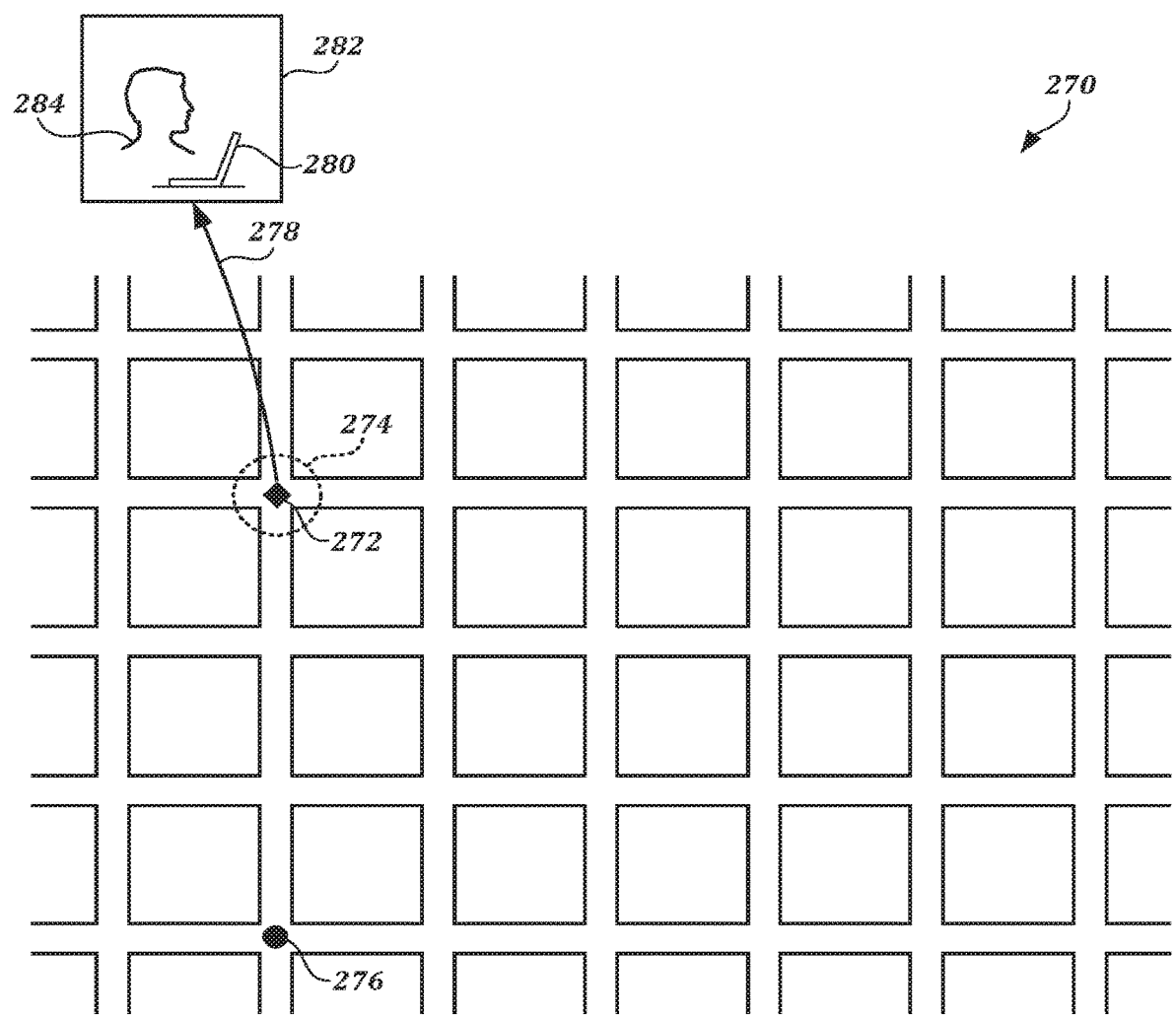
FIG. 7 depicts an embodiment of location-based metadata tagging of information, in accordance with the embodiments disclosed herein.
Figure 8:
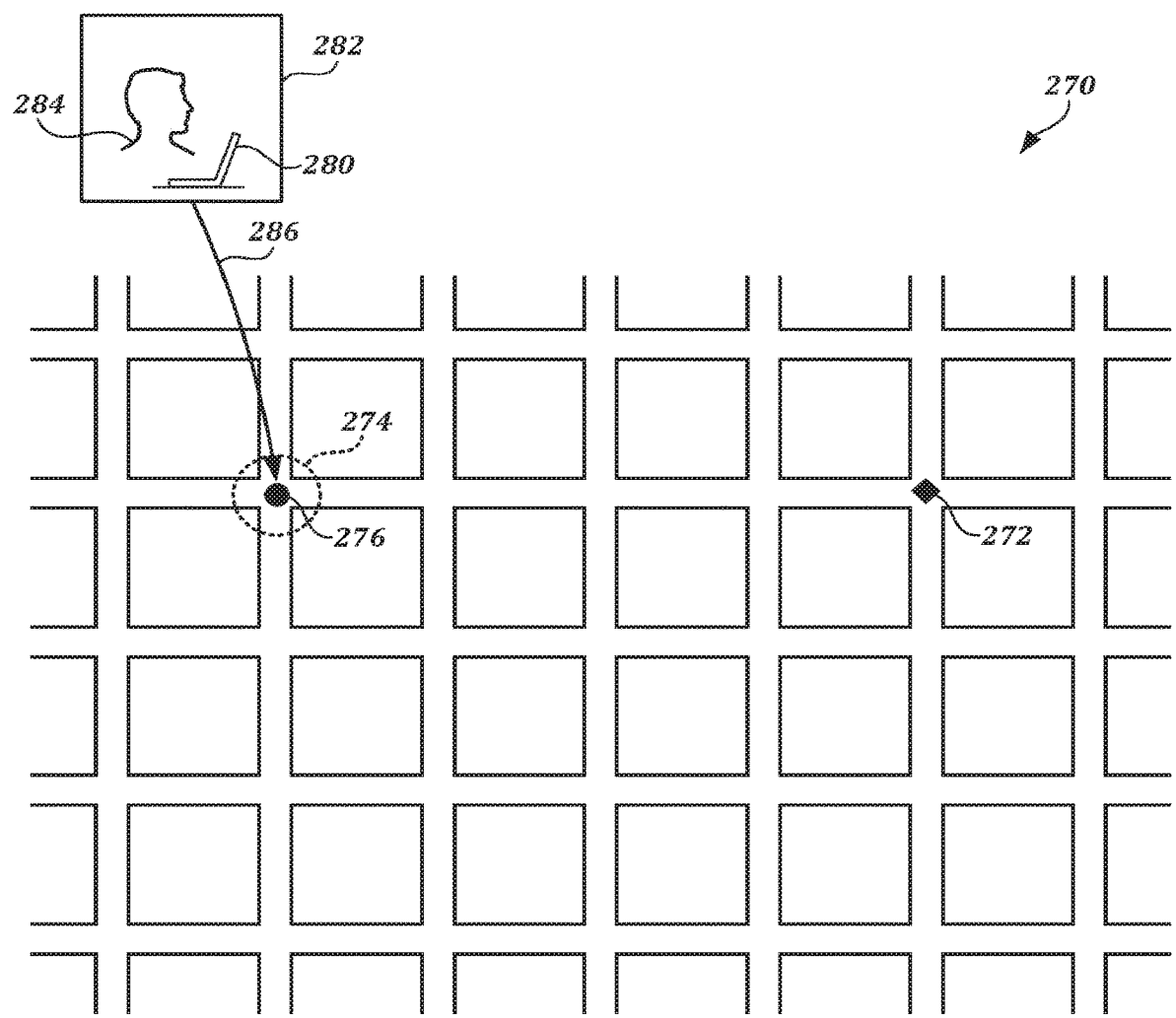
FIG. 8 depicts an embodiment of distributing information with location-based metadata tags, in accordance with the embodiments disclosed herein.

An embodiment of location-based metadata tagging of information is depicted in FIGS. 7 and 8. A map 270 is depicted in FIGS. 7 and 8. In FIG. 7 a first responder 272 is at a particular locale 274. The locale 274 can be defined in many ways, such as an intersection of two streets, an address, a set of global coordinates, and the like. In the particular embodiment shown, the locale 274 is the intersection of two streets. The map 270 also includes indications of locations of a first responder 272 and a second responder 276. Each of the first responder 272 and the second responder 276 has a computing device (e.g., computing device 112).

At the point depicted in FIG. 7, the first responder 272 sends a communication 278 using the computing device from the locale 274 to a remote computing device 280. In the particular embodiment shown in FIG. 7, the remote computing device 280 is located at an agency office 282 and used by a user 284. In some embodiments, the user 284 is a dispatcher or a supervisor of the first responder 272. In other embodiments, the remote computing device 280 can be automated and operate even without the user 284 (e.g., when the remote computing device 280 is a server).

In one embodiment, the communication 278 sent by the first responder 272 from the locale 274 to the remote computer 280 includes information obtained at the locale 274. In some examples, the information is one or more of audio received by a microphone, video or an image taken by a camera, text entered into the computing device, and the like. Metadata associated with the information is tagged with an indication of the locale 274. The metadata can be tagged by the computing device before the communication 278 is sent or by the remote computing device 280 after the communication 278 is sent. The remote computing device 280 is configured to store the information with the location-based metadata tag.

At the point depicted in FIG. 8, the first responder 272 has left the locale 274 and the second responder 276 has arrived at the locale 274. In one embodiment, the remote computing device 280 determines that the second responder 276 is at the locale 274. In response to determining that the second responder 276 is at the locale 274, the remote computing device 280 sends a communication 286 to the computing device of the second responder 276. The communication 286 includes the information with the location-based metadata tag. In this way, information pertinent to the particular locale 274 is shared between the first responder 272 and the second responder 276, even if the first responder 272 and the second responder 276 are not aware of each other's activities. In one embodiment, the first responder 272 and the second responder 276 are from different responder agencies.

Figure 9:
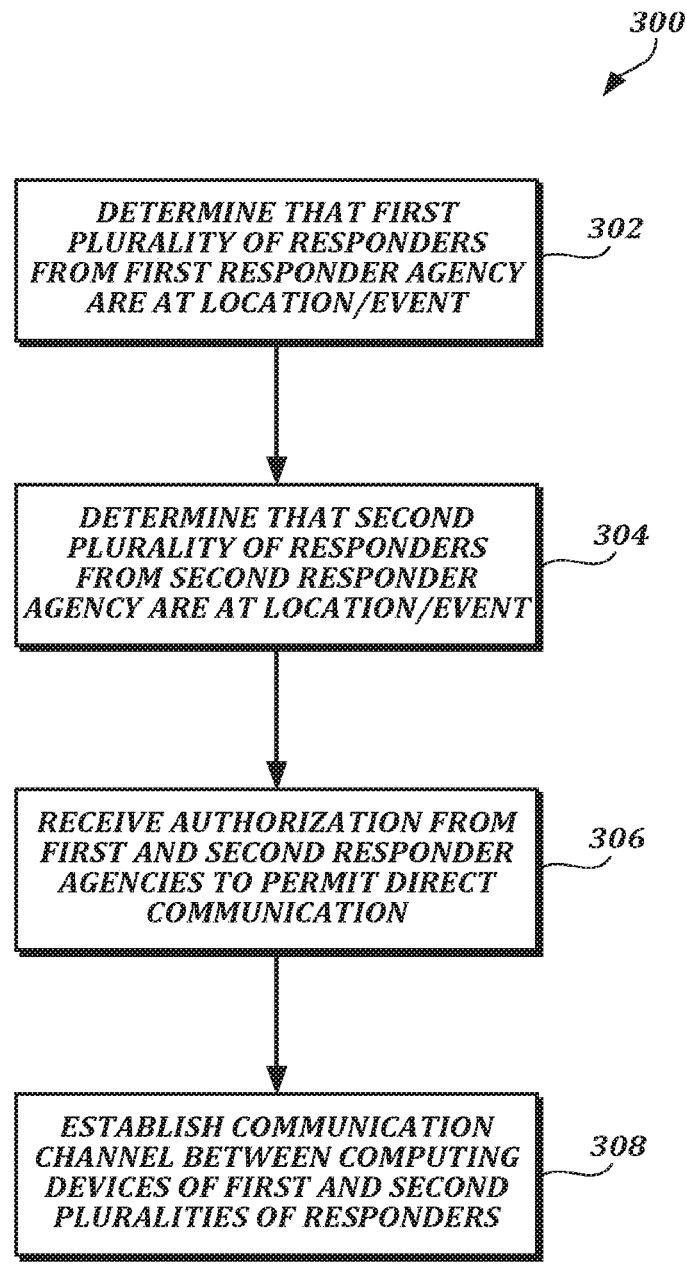
FIG. 9 depicts an embodiment of a method of communicating among responders from a plurality of responder agencies, in accordance with the embodiments disclosed herein.

An embodiment of a method 300 of communicating among responders from a plurality of responder agencies is depicted in FIG. 9. At block 302, a determination is made that a first plurality of responders from a first responder agency are located at an event or location. In one example, each of the first plurality of responders has a computing device and the computing devices of the first plurality of responders are configured to communicate with each other. At block 304, a determination is made that a second plurality of responders from a second responder agency are located at the event or location. In one example, each of the second plurality of responders has a computing device and the computing devices of the second plurality of responders are configured to communicate with each other.

At block 306, authorization is received from the first and second responder agencies to permit direct communication between responders from the first and second responder agencies. At block 308, a communication link is established between the computing devices of the first plurality of responders and the computing devices of the second plurality of responders. The communication link permits direct communication between the first plurality of responders and the second plurality of responders. In one example, the communication link is established in response to determining that the first plurality of responders and the second plurality of responders are located at the event or location and in response to receiving the authorization.

Figure 10:
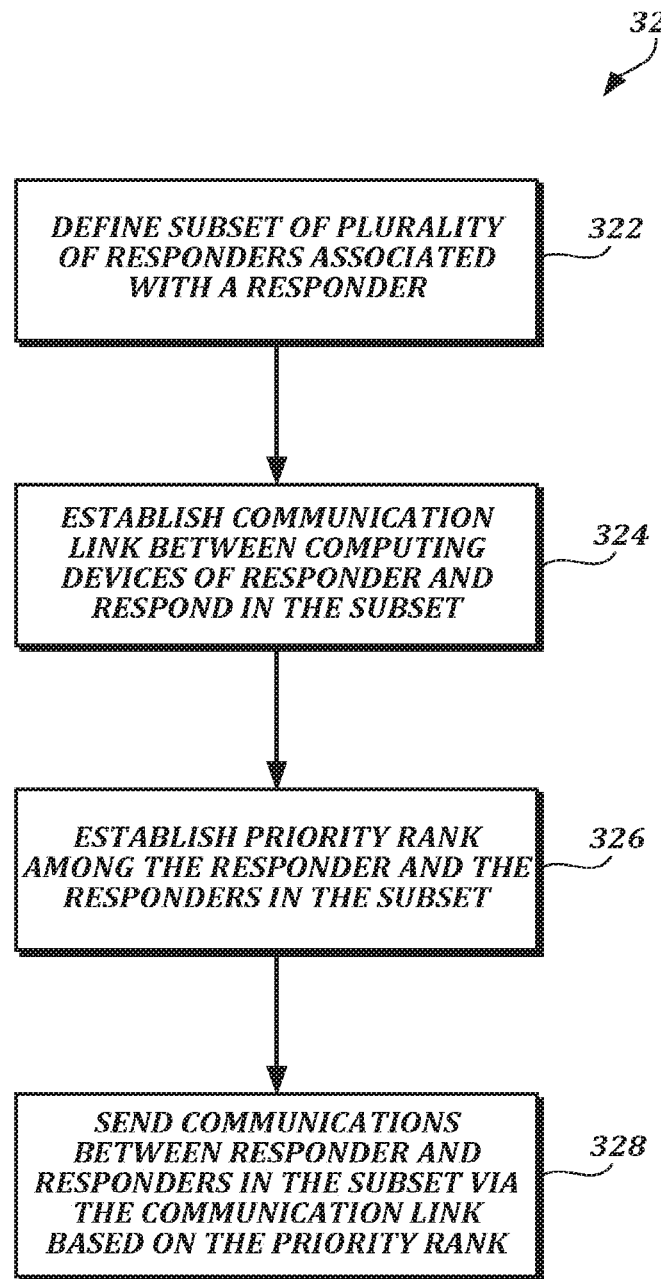
FIG. 10 depicts an embodiment of a method of communicating among a plurality of responders, in accordance with the embodiments disclosed herein.

An embodiment of a method 320 of communicating among a plurality of responders is depicted in FIG. 10. At block 322, a subset of a plurality of responders is defined where the responders are associated with a first responder. In one example, the responders are from the same responder agency as the first responder. In another example, the responders are at a location or event at which the first responder is located. In another example, the subset is defined by the first responder providing an indication of the subset (e.g., indicating particular responders in the subset, selecting a geographic area on a map where the responders in the subset are in the geographic area, etc.). At block 324, a communication link is established between the computing devices of the first responder and the plurality of responders in the subset.

At block 326, a priority rank among the first responder and the responders in the subset is established. At block 328, communications between computing devices of the first responder and the responders are sent via the communication link subset based on the priority rank. In one example, the priority rank reflects a hierarchy of the first responder and the responders in the subset within a responder agency. In another example, the subset includes a responder, the responder's partner, the responder's supervisor, and a dispatcher, and the priority rank give priority to communications from the dispatcher, the responder's supervisor, and the responder's partner, in that order. In another example, the communications are push-to-talk communications and the computing devices of the responders are configured to determine a conflict between push-to-talk audio communications sent by two responders and to play one of the push-to-talk audio communications based on the priority rank of the two responders. In another example, the priority rank determines an importance of messages sent via the communication link. In another example, the computing devices of the first responder and the responders in the subset are configured to display or sound the communications based on the priority rank.

Figure 11:
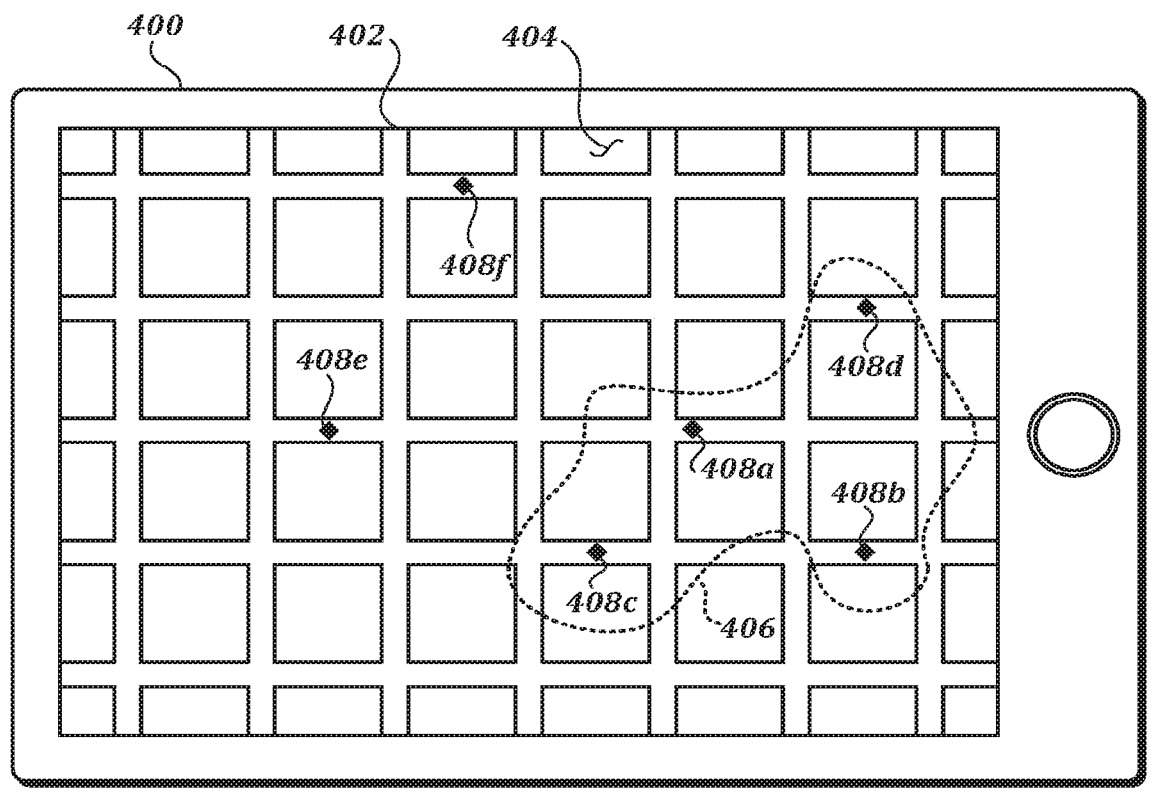
FIG. 11 depicts an embodiment of selecting a subset based on an indication of the subset from a responder, in accordance with the embodiments disclosed herein.

An embodiment of selecting a subset based on an indication of the subset from a responder is depicted in FIG. 11. In the depicted embodiment, a computing device 400 with a touchscreen display 402. A map 404 is displayed by the touchscreen display 402. In this example, a responder input in the form of a geographic boundary 406 is drawn on the touchscreen display 402 over the map 404. The map 404 optionally includes indications of responders 408*a-f* located in the area of the map. In one example, the locations of the responders 408*a-f* are determined based on locations of computing devices of the responders 408*a-f*. In the embodiment shown in FIG. 11, the responders 408*a-d* located with the geographic boundary 406 drawn on the map 404 are included in the subset. In one embodiment, when a responder input indicates that a superior of the responder is to be included in the subset, the computing device requests confirmation to add the superior of the responder. For example, if a police officer indicates that the chief of police is to be added to the subset, the computing device asks the police officer for confirmation that the chief of police should be included in the subset.

Figure 12:
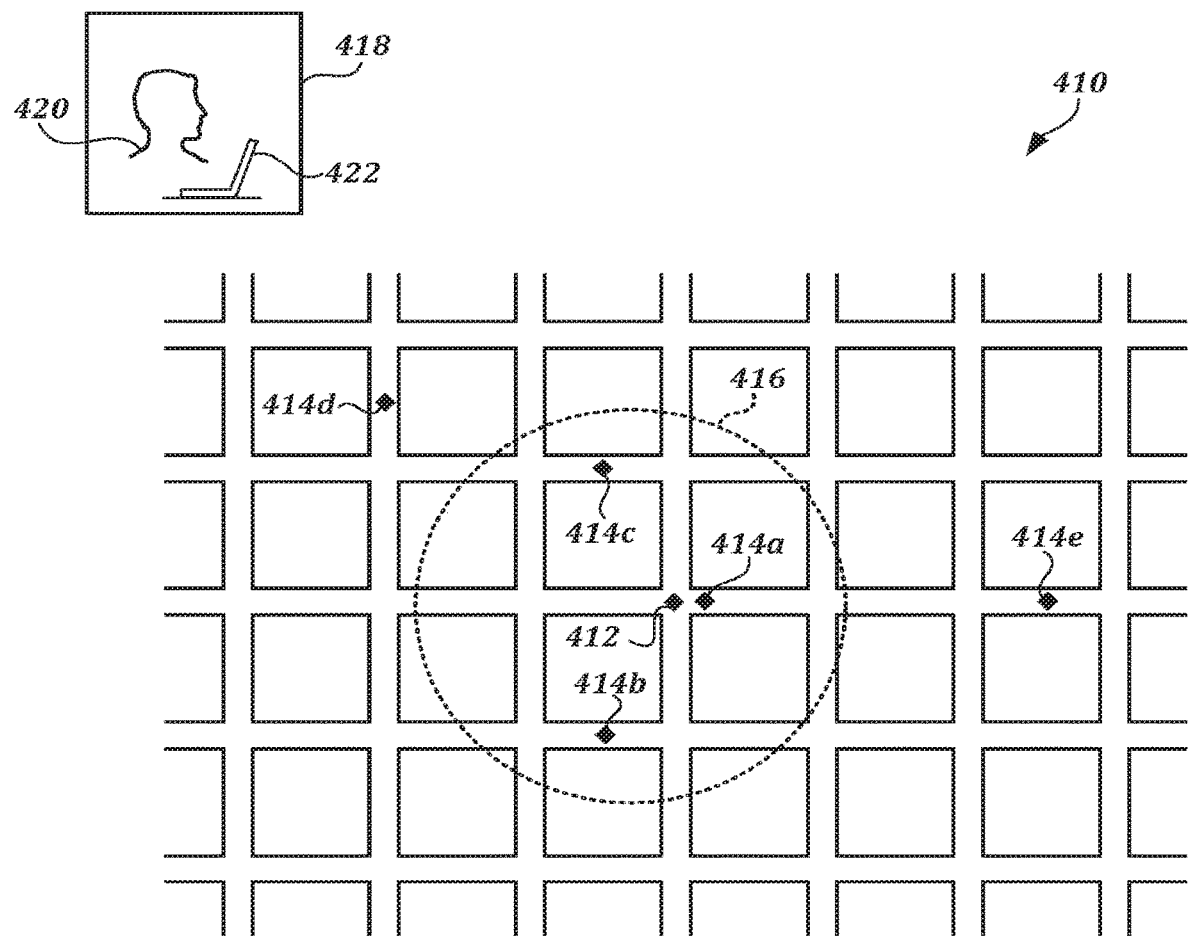
FIG. 12 depicts an embodiment of selecting a subset based on locations of responder computing devices and/or a priority rank of responders, in accordance with the embodiments disclosed herein.

An embodiment of selecting a subset based on locations of responder computing devices and/or a priority rank of responders is depicted in FIG. 12. In the depicted embodiment, a map 410 indicates locations of a responder 412 and other responders 414*a-e*. In one embodiment, the subset of responders includes those of the responders 414*a-e* that are located with a particular distance from the responder 412. For example, FIG. 12 indicates an area 416 within a particular radius of the responder 412, the responders 414*a-c* are located with the area, and the responders 414*a-c* are included in the subset. In another embodiment, the subset of responders is selected based on a priority rank of responders. FIG. 4 also depicts a remote location 418 (e.g., a police station) with a responder 420 and a computing device 422 of the responder 420. In one example, the responder 420 is a supervisor of the responder 412. In this case, the subset includes the responder 420 because the responder 420 is the supervisor of the responder 412.

Combining the two embodiments depicted in FIG. 4, a subset is selected based on the location of responders and the priority rank to include the responder 412, the responders 414*a-c*, and the responder 420 in a subset of responders. A communication link is established between the computing devices of the responder 412, the responders 414*a-c*, and the responder 420. Communications are sent via the communication link based on a priority rank of the responder 412, the responders 414*a-c*, and the responder 420. In one example, the computing devices of the responder 412 and the responders 414*a-c* are configured to give priority to displaying and/or sounding communications from the computing device 422 of the responder 420.

In another embodiment, the communications links described herein are capable of being used to send both broadcast communications and direct communications. Using the example from FIG. 12 where the responder 412, the responders 414*a-c*, and the responder 420 are in the subset, broadcast communications sent by one responder of the subset are sent to the computing devices of the other responders in the subset. For example, responder 414*a* sends a broadcast message that is received by the computing devices of the responder 412, the responders 414*b-c*, and the responder 420. In one example, the responder 412 may want to respond to the broadcast message of the responder 414*a* but not send the response to all of the responders in the subset. In the example, the computing device of the responder 412 permits the responder 412 to select that a direct communication be sent back to the responder 414a. The direct communication is sent from the computing device of the responder 412 to the computing device of the responder 414a, but is not sent to the computing devices of the responders 414b-c and the responder 420.

Unless otherwise specified in the context of specific examples, described techniques and tools may be implemented by any suitable computing device or set of computing devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 13:
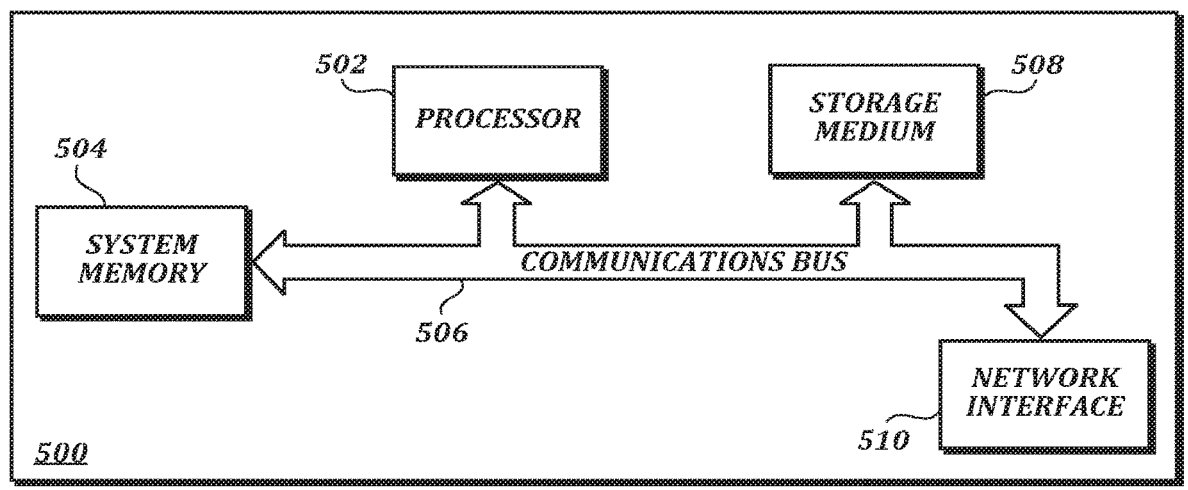
FIG. 13 depicts a block diagram that illustrates aspects of an illustrative computing device appropriate for use in accordance with embodiments of the present disclosure.

FIG. 13 depicts a block diagram that illustrates aspects of an illustrative computing device 500 appropriate for use in accordance with embodiments of the present disclosure. The description below is applicable to servers, personal computers, mobile phones, smart phones, tablet computers, embedded computing devices, and other currently available or yet to be developed devices that may be used in accordance with embodiments of the present disclosure.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or other memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 13, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, 4G, LTE, WiMAX, Bluetooth, and/or the like.

In the illustrative embodiment depicted in FIG. 13, the computing device 500 also includes a storage medium 508. However, services may be accessed using a computing device that does not include means for persisting data to a local storage medium. Therefore, the storage medium 508 depicted in FIG. 13 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic tape, magnetic disk storage, and/or the like.

As used herein, the term "computer readable medium" includes volatile and nonvolatile and removable and nonremovable media implemented in any method or technology capable of storing information, such as computer readable instructions, data structures, program modules, or other data. In this regard, the system memory 504 and storage medium 508 depicted in FIG. 13 are examples of computer readable media.

For ease of illustration and because it is not important for an understanding of the claimed subject matter, FIG. 13 does not show some of the typical components of many computing devices. In this regard, the computing device 500 may include input devices, such as a keyboard, keypad, mouse, trackball, microphone, video camera, touchpad, touchscreen, electronic pen, stylus, and/or the like. Such input devices may be coupled to the computing device 500 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer readable storage medium (e.g., in memory or persistent storage on a client device, server, administrator device, or some other device). Input devices can be separate from and communicatively coupled to computing device 500 (e.g., a client device), or can be integral components of the computing device 500. In some embodiments, multiple input devices may be combined into a single, multifunction input device (e.g., a video camera with an integrated microphone). The computing device 500 may also include output devices such as a display, speakers, printer, etc. The output devices may include video output devices such as a display or touchscreen. The output devices also may include audio output devices such as external speakers or earphones. The output devices can be separate from and communicatively coupled to the computing device 500, or can be integral components of the computing device 500. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft.NET™ languages such as C #, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Embodiments disclosed herein include a computer-implemented method for performing one or more of the above-described techniques; a computing device comprising a processor and computer-readable storage media having stored thereon computer-executable instructions configured to cause the server computer to perform one or more of the above-described techniques; a computer-readable storage medium having stored thereon computer-executable instructions configured to cause a computing device to perform one or more of the above-described techniques; a computing system comprising a server that provides one or more of the above-described services. The computer system may further comprise plural client computing devices; and a client computing device in communication with a server that provides one or more of the above-described services, the client computing device comprising a processing unit and computer-readable storage media having stored thereon computer-executable instructions configured to cause the client computing device to perform one or more of the above-described techniques.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

While illustrative embodiments have been illustrated and described, it will be appreciated that various changes can be made therein without departing from the spirit and scope of the claimed subject matter.

What is claimed is:

1. A computer-implemented method performed by at least one computing device for communicating among responders, the method comprising:
   receiving, via at least one network interface of the at least one computing device, an indication of a location of a first computing device of a first responder;
   receiving, via the at least one network interface, an indication of a location of a second computing device of a second responder;
   receiving, via the at least one network interface, an indication of a location of a third computing device of a third responder;
   determining a location of an event;
   defining a subset of computing devices in accordance with the indication of the location of the first computing device, the indication of the location of the second computing device, the indication of the location of the third computing device, and the location of the event;
   establishing a communication link between the subset of computing devices; and
   sending communications between the subset of computing devices via the communication link, wherein:
      the subset of computing devices includes the first computing device in accordance with the indication of the location of the first computing device and the location of the event;
      the subset of computing devices includes the second computing device in accordance with the indication of the location of the second computing device and the location of the event; and
      the subset of computing devices does not include the third computing device in accordance with the indication of the location of the third computing device and the location of the event, wherein:
         determining the location of the event comprises displaying, via a display of the at least one computing device, a map that includes an indication of a location of the first responder in an area of the map based on the location of the first computing device, an indication of a location of the second responder in the area of the map based on the location of the second computing device, and an indication of a location of the third responder in the area of the map based on the location of the third computing device; and defining the subset of computing devices comprises, after the map is displayed via the display, receiving an indication of the subset of computing devices via a user interface of the at least one computing device in accordance with the map, wherein the subset of computing devices is defined after the indication of the subset of computing devices is received.

2. The computer-implemented method of claim 1, wherein receiving the indication of the subset of computing devices comprises:

receiving, via the user interface of the at least one computing device, a selection of a geographic boundary on the map; and determining the subset of computing devices includes one or more selected computing devices located within the geographic boundary on the map, wherein:

the one or more selected computing devices include the first computing device and the second computing device;

the location of the first computing device is located within the geographic boundary on the map;

the location of the second computing device is located within the geographic boundary on the map; and the location of the third computing device is not located within the geographic boundary on the map.

3. The computer-implemented method of claim 2, wherein receiving the selection of the geographic boundary comprises receiving a responder input of the geographic boundary drawn on the map.

4. The computer-implemented method of claim 3, wherein the display comprises a touchscreen display and the responder input is received via the touchscreen display.

5. The computer-implemented method of claim 2, wherein the geographic boundary comprises a particular radius of distance relative to the location of the first computing device.

6. The computer-implemented method of claim 2, wherein the geographic boundary is defined by an intersection of two streets, an address, or a signal indicative of the event received from the first computing device.

7. The computer-implemented method of claim 2, wherein the geographic boundary has an irregular shape.

8. The computer-implemented method of claim 2, wherein determining the location of the event comprises:

displaying, via the display, the location of the first computing device on the map in accordance with the indication of the location of the first computing device;

displaying, via the display, the location of the second computing device on the map in accordance with the indication of the location of the second computing device; and displaying, via the display, the location of the third computing device on the map in accordance with the indication of the location of the third computing device.

9. The computer-implemented method of claim 2, further comprising:

sending first authorization for the first computing device to permit the first computing device to establish the communication link with the second computing device when the first computing device is determined to be located at the location of the event; and sending second authorization for the second computing device to permit the second computing device to establish the communication link with the first computing device when the second computing device is determined to be located at the location of the event.

10. The computer-implemented method of claim 2, wherein the at least one computing device comprises the first computing device and sending the communications comprises initiating a transmission in accordance with a button of the first computing device being pressed and, in accordance with the initiating, transmitting live audio from the first computing device to the second computing device via the communication link.

11. The computer-implemented method of claim 1, wherein the communications include push-to-talk audio communications.

12. The computer-implemented method of claim 1, wherein the communications include first audio from a first on-body microphone of the first responder and second audio from a second on-body microphone of the second responder.

13. The computer-implemented method of claim 1, wherein:

the event comprises use of a stun device by the first responder; and determining the location of the event comprises receiving an indication of the use of the stun device from the first computing device of the first responder.

14. One or more non-transitory computer-readable media storing executable instructions that, when executed by at least one processor of at least one computing device, cause the at least one computing device to perform operations comprising:

receiving, via at least one network interface of the at least one computing device, an indication of a location of a first computing device of a first responder;

receiving, via the at least one network interface, an indication of a location of a second computing device of a second responder;

receiving, via the at least one network interface, an indication of a location of a third computing device of a third responder;

determining a location of an event;

defining a subset of computing devices located at the event, wherein the subset of computing devices includes the first computing device and the second computing device, and wherein the subset of computing devices does not include the third computing device; and establishing a communication link for communications between the subset of computing devices, wherein defining the subset of computing devices includes:

determining the first computing device is located at the event in accordance with the indication of the location of the first computing device and the location of the event;

determining the second computing device is located at the event in accordance with the indication of the location of the second computing device and the location of the event; and determining the third computing device is not located at the event in accordance with the indication of the location of the third computing device and the location of the event, wherein:

determining the location of the event comprises:
    displaying, via a display of the at least one computing device, a map;
    displaying, via the display, the location of the first computing device on the map in accordance with the indication of the location of the first computing device;
    displaying, via the display, the location of the second computing device on the map in accordance with the indication of the location of the second computing device; and
    displaying, via the display, the location of the third computing device on the map in accordance with the indication of the location of the third computing device; and
defining the subset of computing devices comprises:
    receiving, via a user interface of the at least one computing device, a selection of a geographic boundary on the map, wherein:
    the selection is received after the map, the location of the first computing device, the location of the second computing device, and the location of the third computing device are displayed; and
    the subset of computing devices is defined after the selection is received.

15. The media of claim 14, wherein determining the location of the event comprises:
    determining the subset of computing devices to include one or more selected computing devices located within the geographic boundary on the map, wherein:
    the selected one or more computing devices include the first computing device and the second computing device;
    the location of the first computing device is within the geographic boundary on the map;
    the location of the second computing device is within the geographic boundary on the map; and
    the location of the third computing device is not within the geographic boundary on the map.

16. The media of claim 15, wherein receiving the selection of the geographic boundary on the map comprises receiving a responder input of the geographic boundary drawn on the map.

17. The media of claim 16, wherein the communications include push-to-talk audio communications, and wherein the push-to-talk audio communications comprise first audio from a first on-body microphone of the first responder and second audio from a second on-body microphone of the second responder.

18. A first computing device of a first responder for communicating among responders, the computing device comprising:
    a user interface including a display;
    a processor;
    a network interface; and
    a non-transitory computer-readable storage media having stored thereon computer-executable instructions that, when executed by the processor, are configured to cause the first computing device to perform operations comprising:
    determining a location of the first computing device of the first responder;
    receiving, via the network interface, an indication of a location of a second computing device of a second responder;
    receiving, via the network interface, an indication of a location of a third computing device of a third responder;
    determining a location of an event;
    defining a subset of computing devices in accordance with the location of the first computing device, the indication of the location of the second computing device, the indication of the location of the third computing device, and the location of the event;
    establishing a communication link between the subset of computing devices; and
    sending, via the network interface and the communication link, communications between the subset of computing devices, wherein:
    the subset of computing devices includes the first computing device in accordance with the indication of the location of the first computing device and the location of the event;
    the subset of computing devices includes the second computing device in accordance with the indication of the location of the second computing device and the location of the event; and
    the subset of computing devices does not include the third computing device in accordance with the indication of the location of the third computing device and the location of the event, and wherein:
    determining the location of the event comprises:
        displaying, via the display, a map, the location of the first computing device on the map, the location of the second computing device on the map, and the location of the third computing device on the map; and
    defining the subset of computing devices comprises:
        receiving, via the user interface, a responder input of a geographic boundary drawn on the map, wherein the subset of computing devices is defined after the map, the location of the first computing device on the map, the location of the second computing device on the map, and the location of the third computing device on the map are displayed and the responder input is received.

19. The first computing device of claim 18, wherein defining the subset of computing devices comprises:
    determining the location of the first computing device is within the geographic boundary drawn on the map;
    determining the location of the second computing device is within the geographic boundary drawn on the map; and
    determining the location of the third computing device is not within the geographic boundary drawn on the map.

20. The first computing device of claim 19, wherein the communications include push-to-talk audio communications comprising first audio from a first on-body microphone of the first responder and second audio from a second on-body microphone of the second responder.

* * * * *